March 8, 1960    B. L. MILNE    2,927,803
SCHOOL BANK BOOK
Filed Oct. 18, 1957
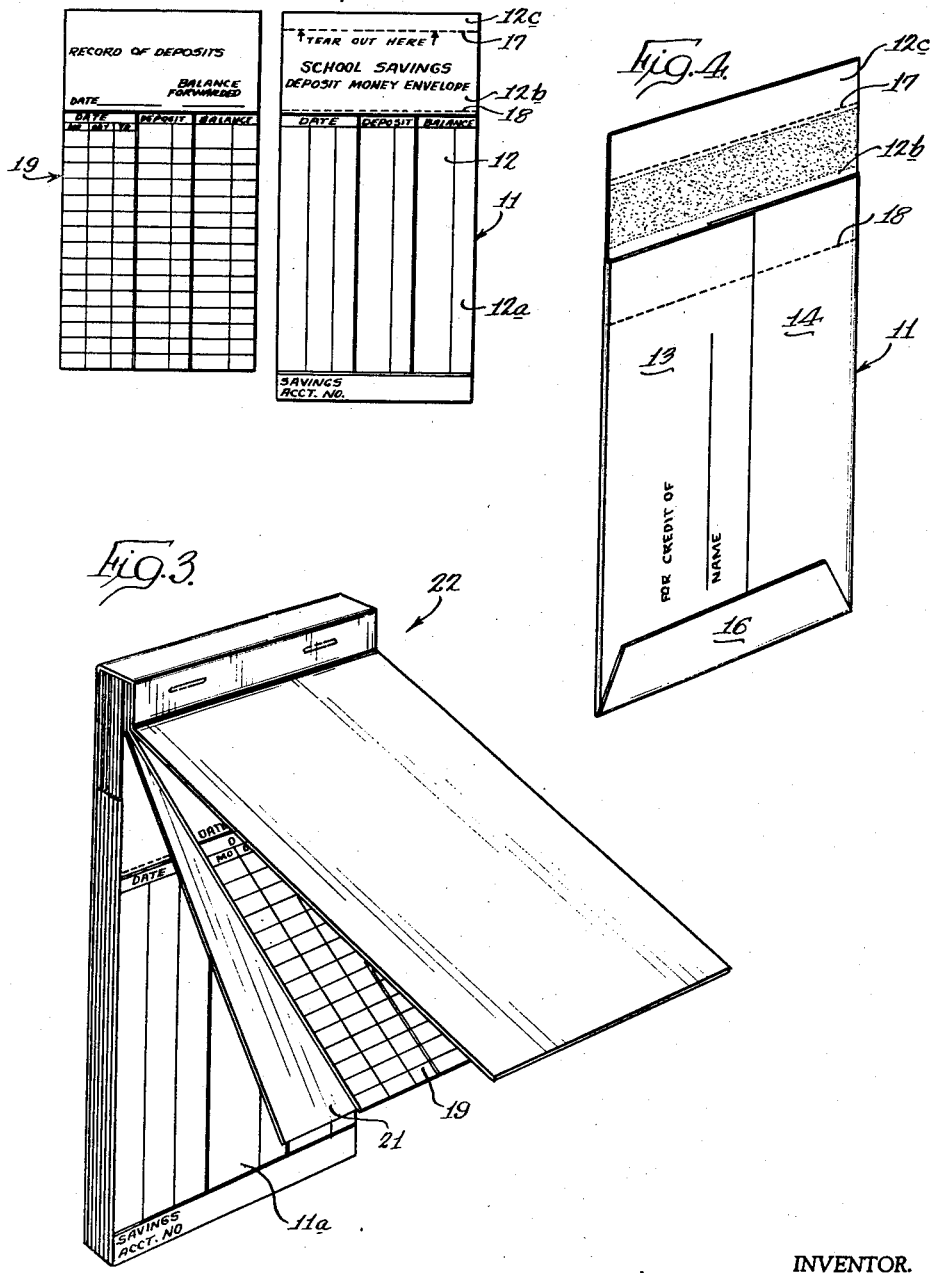
INVENTOR.
Bruce L. Milne
BY
Schroeder, Hofgren, Brady & Wegner
Attys.

United States Patent Office 2,927,803
Patented Mar. 8, 1960

2,927,803

SCHOOL BANK BOOK

Bruce L. Milne, Redmond, Wash., assignor to Carpenter Paper Company, a corporation of Delaware Application October 18, 1957, Serial No. 691,064

1 Claim. (Cl. 282—25)

The present invention pertains generally to a system for handling deposits for school "bank days" and more particularly to a new and novel means for handling and recording the money which is deposited by students on "bank days."

In many school districts throughout the country it is the practice to set aside a day each week known as "bank day," when the members of various classes deposit a sum—usually quite small—in their individual bank accounts.

In the past, it has been the practice for the teacher to receive the money from the pupils along with the passbook and deposit slip; and to send the money, passbook and deposit slip by messenger to the bank where the deposits are entered and the passbooks are returned by messengers to the school for distribution to the students. There are, of course, other methods of handling the deposits, but they all entail bookkeeping on the part of the teacher and return of deposit receipts by the bank. While it is good public relations for the banking profession and a public service to encourage savings accounts on the part of school children, the ten and fifteen cent deposits are not such that they can support a large expenditure for account services and generally such deposits result in little or no profit to the banks because of the large bookkeeping overhead involved.

A manager of a bank having six thousand school savings accounts has estimated that the savings to his bank to be gained by using the bank book of the present invention is forty-five hundred dollars annually. These savings are gained through time saved in the elimination of posting deposits to passbooks, writing receipts which are not necessary, virtual elimination of lost passbooks, the elimination of having to call in the passbooks for posting interest, and the reduction of messenger service necessary.

The advantages to the school are in the simplification of the "bank day" mechanics. Since the teacher simply collects the prepared deposit envelopes, valuable class time is saved, no money need be handled in class, and no passbooks have to be collected and redistributed. In addition to the class saving, the teacher's valuable time is conserved by eliminating her bookkeeping function so that there are no deposits to check, no totals to reconcile, and no banking supplies to contend with.

The present invention provides a compact package or kit including a deposit envelope, a permanent record, and means for convenient handling thereof. With the present invention the deposit record is kept at home rather than being carried to and from school, thereby eliminating one costly item in children's accounts—the replacement of lost passbooks.

Since the record is kept at home, the parents have an opportunity to give individual guidance to their children in the savings program, and to relieve the teacher of much of the bookkeeping of the savings program.

The deposit envelope serves as a money container and a deposit form so that the child simply brings his deposit to school in the money container and hands the container to the teacher who forwards it to the bank by messenger. The depositor's permanent record of the account is kept in the home so that unless there is a mistake on the deposit envelope there is no necessity for a return receipt from the bank, thereby eliminating the necessity for receipts, posting in the passbook, and a trip from the bank back to the school to return the passbooks and receipts.

It is therefore a primary object of the present invention to provide a compact kit comprising deposit envelopes in combination with a permanent record means for use in "bank day" collections.

It is another object of the present invention to provide a money container for transportation of money from the home to the school for deposit on bank days.

It is a further object of the present invention to provide means for children to be assisted by their parents in preparing their savings deposits for school bank days.

Yet another object of the present invention is to provide means for handling deposits on school bank days which eliminate the necessity for the handling of passbooks.

These and other objects of the present invention will be apparent to one skilled in the art from a reading of the following detailed description when taken in conjunction with the drawings wherein:

Figure 1 is an illustration of the permanent deposit record used in the present invention;

Figure 2 is a plan view of the deposit envelope used in the present invention;

Figure 3 is a perspective view of the savings kit used in the present invention; and Figure 4 is a rear perspective view of the deposit envelope of the present invention.

Referring first to Figures 2 and 4, a deposit envelope 11 is formed, of non-opaque material, with a front face 12, two overlapping side panels 13 and 14 and a bottom flap 16 which are glued together to form a conventional envelope open at the top. The purpose of the non-opaque material is to enable the bank teller to ascertain the presence of money in the envelope prior to opening thereof so that the envelope may be returned unopened if the money has inadvertently been left out. The front face 12 of the deposit envelope 11 is divided into three sections 12a, 12b, and 12c by two score lines 17 and 18. The score line 18 is extended to the side panels 13 and 14 of the envelope blank for purposes to be herein described.

A portion 12a of the front panel 12 has spaces thereon for identification of the particular deposit to be placed therein. This information includes the savings account number, the date, the amount of the deposit and the balance in the depositor's account. The top portion 12c of the panel 12 is provided to serve as a securing means for holding the deposit envelope 11 in a savings kit or book, and the center portion 12b is provided with mucilage on its backside and a fold line to enable closing of the envelope by closing the portion 12b so that the entire portion 12b remains above the perforated line 18.

The deposit envelope 11 is so constructed that the depositor can tear the envelope out of the deposit kit along the perforated line 17, after entering his deposit information on the portion 12a therefor, place his deposit within the envelope and fold the portion 12b over for transportation of the deposit from the home to the school and from there to the bank. After the deposit envelope is received at the bank, the cashier or teller removes the top portion 12b by tearing the envelope on the perforated line 18 and removes the money therefrom. It will be noted that removal of the portion 12b leaves the portion 12a completely intact so that the deposit information is before the teller at the time he removes the money from the envelope so that he can check the actual deposit against the deposit information to check for errors.

A permanent record of the student depositor is kept on a deposit record 19, an illustration of which is shown in Figure 1. The deposit record is provided with space to note the date of deposit, the amount of deposit and the balance and is used in place of a passbook. The deposit record 19 is bound into a saving kit illustrated in Figure 3 with its information columns such as date, deposit, and balance corresponding to the deposit information columns discussed above with regard to the deposit envelope 11 and a sheet of carbon paper 21 or any other suitable means of impression reproduction is inserted between the deposit sheet 19 and a plurality of deposit envelopes 11 which are bound together in the saving kit indicated generally as 22. One of the plurality of deposit envelopes which are secured in the binder is of a different color than the others, and is placed near the bottom of the stack so as to notify the bank that the supply of envelopes in a particular book is about exhausted. The savings kit 22 has a protective cover 23 to protect the unused deposit envelopes and the deposit slip while the book is in use and after the deposit slip is completed as a permanent record.

In using the savings kit of my present invention, the deposit information is recorded on the deposit record sheet in the savings kit 22. This information is transferred by means of the carbon sheet 21 in the kit to the first envelope 11a in the savings kit. The envelope 11a is then removed from the kit by tearing it along the perforated line 17 as described above and the money is deposited therein. As pointed out above, the posting of the deposit information on the permanent record appears on the deposit envelope so that the envelope now may be transferred to the bank with complete information and the depositor has a complete record of the transaction. Since the permanent record information and that on the deposit envelope is one and the same there can be no mistake. Therefore, if the deposit information tallies with the amount when the teller receives the deposit, the permanent record is automatically correct thus eliminating the need for a passbook. Upon receipt of the deposit envelope at the bank the teller removes the portion 12b from the envelope and checks the contents against the deposit information and if it is correct the transaction is complete.

With the bank day kit of the present invention it is not necessary to call in the passbooks for posting of interest. When interest is to be added to the savings account, a notice is sent to the depositor who then enters his interest as an additional deposit on his subsequent deposit envelope and record and then carries the balance over to the balance column which makes the permanent record complete and advises the bank as to the amount entered by the depositor so that the teller can check against the bank records to ascertain that the correct amount has been entered.

While I have shown and described a certain preferred embodiment of the present invention, it will be understood by those skilled in the art that various rearrangements and modifications may be made without departing from the spirit and scope of the present invention as defined in the appended claim.

I claim:

A school bank book adapted for facilitating deposits made by school children, comprising: a binding; a record sheet having an end portion secured in said binding, said record sheet having ruled columns for deposit and balance information thereon; a plurality of deposit envelopes for holding money to be deposited removably secured in said binding by means of a gummed closure flap thereon, said envelopes having ruled columns aligned with said first mentioned columns for deposit and balance information, said envelopes also having a line of weakening spaced inwardly from the area of sealing engagement of said gummed flap to allow reopening of said envelope without danger of tearing; and a carbon sheet secured in said binding between said record sheet and the uppermost of said plurality of envelopes, whereby information inscribed in the columns of said record sheet may be successively duplicated on the corresponding column on the uppermost of said deposit envelopes and after removal of said uppermost envelope, the next envelope is in position to receive in its columns information inscribed on said sheet.

References Cited in the file of this patent

UNITED STATES PATENTS

| | | |
|---|---|---|
| 408,324 | Raborg | Aug. 6, 1889 |
| 1,164,612 | Hoskins | Dec. 14, 1915 |
| 1,440,481 | Middaugh | Jan. 2, 1923 |
| 1,884,669 | Hannan | Oct. 25, 1932 |
| 1,957,704 | Drachman | May 8, 1934 |
| 2,402,821 | Kosteling | June 25, 1946 |